US010288016B2

(12) United States Patent
Gibson et al.

(10) Patent No.: US 10,288,016 B2
(45) Date of Patent: May 14, 2019

(54) SYSTEM AND METHOD FOR OPERATING AN ENGINE

(71) Applicant: Ford Global Technologies, LLC, Dearborn, MI (US)

(72) Inventors: Alexander O'Connor Gibson, Ann Arbor, MI (US); Christopher M. Short, Ann Arbor, MI (US); Robert Roy Jentz, Westland, MI (US); John Eric Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 285 days.

(21) Appl. No.: 15/247,163

(22) Filed: Aug. 25, 2016

(65) Prior Publication Data

US 2018/0058391 A1    Mar. 1, 2018

(51) Int. Cl.
*F02M 26/49*    (2016.01)
*F02B 37/18*    (2006.01)
*F02D 41/00*    (2006.01)
*F02D 41/26*    (2006.01)

(52) U.S. Cl.
CPC ........... *F02M 26/49* (2016.02); *F02B 37/183* (2013.01); *F02D 41/0002* (2013.01); *F02D 41/005* (2013.01); *F02D 41/0072* (2013.01); *F02D 41/0077* (2013.01); *F02D 41/26* (2013.01); *F02D 2200/0406* (2013.01); *F02D 2200/08* (2013.01); *F02D 2200/703* (2013.01)

(58) Field of Classification Search
CPC ....... F02M 26/49; F02B 37/18; F02B 37/183; F02B 37/186; F02D 41/0002; F02D 41/005; F02D 41/0072; F02D 41/0077; F02D 41/26; F02D 2200/0406; F02D 2200/08; F02D 2200/703
USPC ....... 60/605.2, 602; 701/108, 114; 73/118.1; 123/568.11, 568.12, 568.16, 568.21
See application file for complete search history.

(56) References Cited

U.S. PATENT DOCUMENTS

| | | | |
|---|---|---|---|
| 6,321,732 B1 | 11/2001 | Kotwicki et al. | |
| 6,457,461 B1* | 10/2002 | Romzek | F02D 41/0072 60/605.2 |
| 6,687,601 B2* | 2/2004 | Bale | F02M 26/48 60/605.2 |
| 6,802,302 B1* | 10/2004 | Li | F02D 41/0072 701/108 |
| 6,850,833 B1 | 2/2005 | Wang et al. | |
| 6,925,804 B2* | 8/2005 | Longnecker | F02D 41/0072 60/602 |
| 7,474,954 B1* | 1/2009 | Zagone | F02D 41/0072 701/108 |
| 8,020,538 B2 | 9/2011 | Surnilla et al. | |
| 8,567,189 B2 | 10/2013 | Styles et al. | |
| 9,175,616 B2 | 11/2015 | Yi et al. | |
| 9,181,882 B2 | 11/2015 | Bidner et al. | |
| 9,243,547 B2 | 1/2016 | Vroman et al. | |

(Continued)

*Primary Examiner* — Thai Ba Trieu
(74) *Attorney, Agent, or Firm* — Julia Voutyras; McCoy Russell LLP

(57) ABSTRACT

Methods and systems for operating an engine including an external exhaust gas recirculation (EGR) system are presented. In one non-limiting example, output of a differential pressure sensor and output of an intake manifold pressure sensor are used as a basis for determining whether or not EGR system degradation is present while an engine is operating at conditions other than engine idle conditions.

19 Claims, 4 Drawing Sheets

(56) References Cited

U.S. PATENT DOCUMENTS

| | | |
|---|---|---|
| 9,382,880 B2 | 7/2016 | Surnilla et al. |
| 9,976,521 B1 * | 5/2018 | Jentz .................. F02M 26/49 |
| 2002/0189599 A1 | 12/2002 | Kotwicki et al. |
| 2011/0023847 A1 * | 2/2011 | Gates .................. F02D 41/0072 |
| | | 701/108 |
| 2014/0020362 A1 * | 1/2014 | Warey .................. F02M 26/35 |
| | | 60/274 |
| 2015/0128916 A1 * | 5/2015 | Surnilla .................. F02M 26/49 |
| | | 123/568.12 |
| 2016/0230684 A1 | 8/2016 | Surnilla et al. |

* cited by examiner

SYSTEM AND METHOD FOR OPERATING AN ENGINE

BACKGROUND/SUMMARY

An engine may include an external exhaust gas recirculation (EGR) system to reduce NOx emissions and improve engine efficiency. The external EGR system may couple an engine exhaust manifold to an engine intake manifold. Further, the EGR system may include temperature and pressure sensors to estimate the amount of EGR flowing to engine cylinders. During the course of operation, an EGR actuator, sensor, conduit, or hose may become disconnected. The EGR component may become dislodged due to engine boost pressure, vibrations caused by irregular road surfaces, or other conditions.

EGR systems may be evaluated for degradation during engine idle conditions where engine operating conditions may be stable. By diagnosing the EGR system at engine idle conditions, the possibility of false negative or false positive indications of EGR system degradation may be reduced since engine operating conditions may be more stable at engine idle. Nevertheless, to further improve vehicle fuel economy, engines are being operated without having to be operated at idle conditions. Therefore, it may be desirable to provide a way of reliably diagnosing an EGR system at conditions other than engine idle conditions and adjusting engine operation in response to the EGR system diagnosis.

The inventors herein have recognized the above-mentioned issues and have developed a method for operating an engine, comprising: receiving a differential pressure sensor output and intake manifold pressure sensor output to a controller; judging whether or not exhaust gas recirculation system degradation is present responsive to the differential pressure sensor output and the intake manifold pressure sensor output while operating an engine with intake manifold pressure greater than atmospheric pressure via the controller; and adjusting an engine actuator via the controller responsive to the judgment.

By diagnosing an EGR system when engine intake manifold is greater than atmospheric pressure, it may be possible to extend conditions where an EGR system may be diagnosed so that the engine does not have to operate at idle conditions and consume fuel while idling. Further, extending EGR system evaluation to conditions where the engine operates with higher engine intake manifold pressure may provide more timely mitigating actions and indications of EGR system degradation. In one example, output of a differential pressure sensor may be evaluated at engine intake manifold pressures greater than atmospheric pressure so that evaluation of EGR system degradation may be determined more frequently as compared to systems that evaluate EGR system degradation only at engine idle conditions. Additionally, output of the differential pressure sensor and output of the engine intake manifold pressure sensor may be useful for diagnosing an EGR system at lower engine load conditions without having to operate the engine at idle speed.

The present description may provide several advantages. Specifically, the approach may provide more timely indications of EGR system degradation. Additionally, the approach may an evaluate EGR system over a wider range of engine operating conditions to enable more timely mitigating actions. Further, the approach may reduce engine emissions by reliably reporting EGR system degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
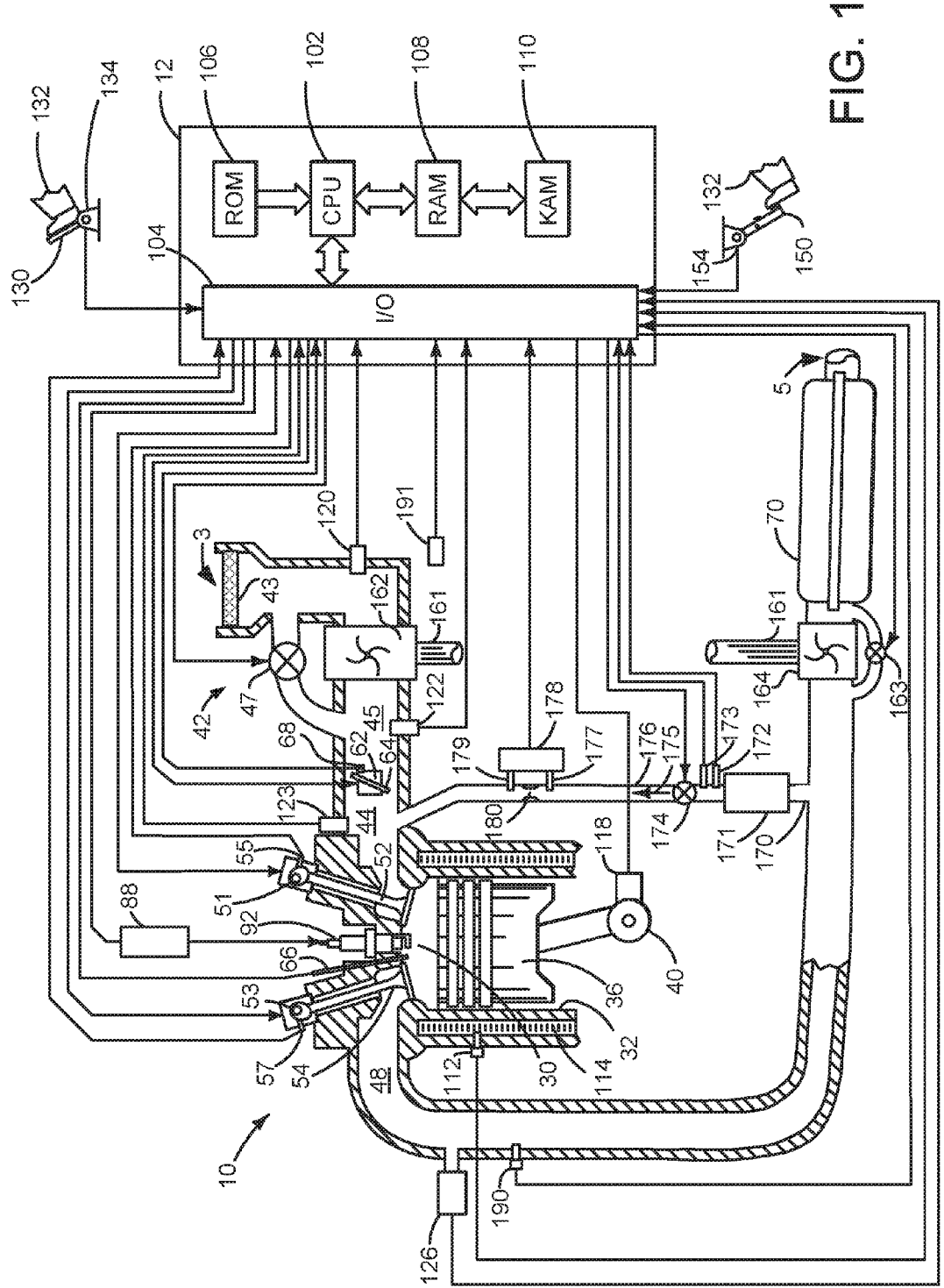
FIG. 1 shows a schematic depiction of an engine.
Figure 2:
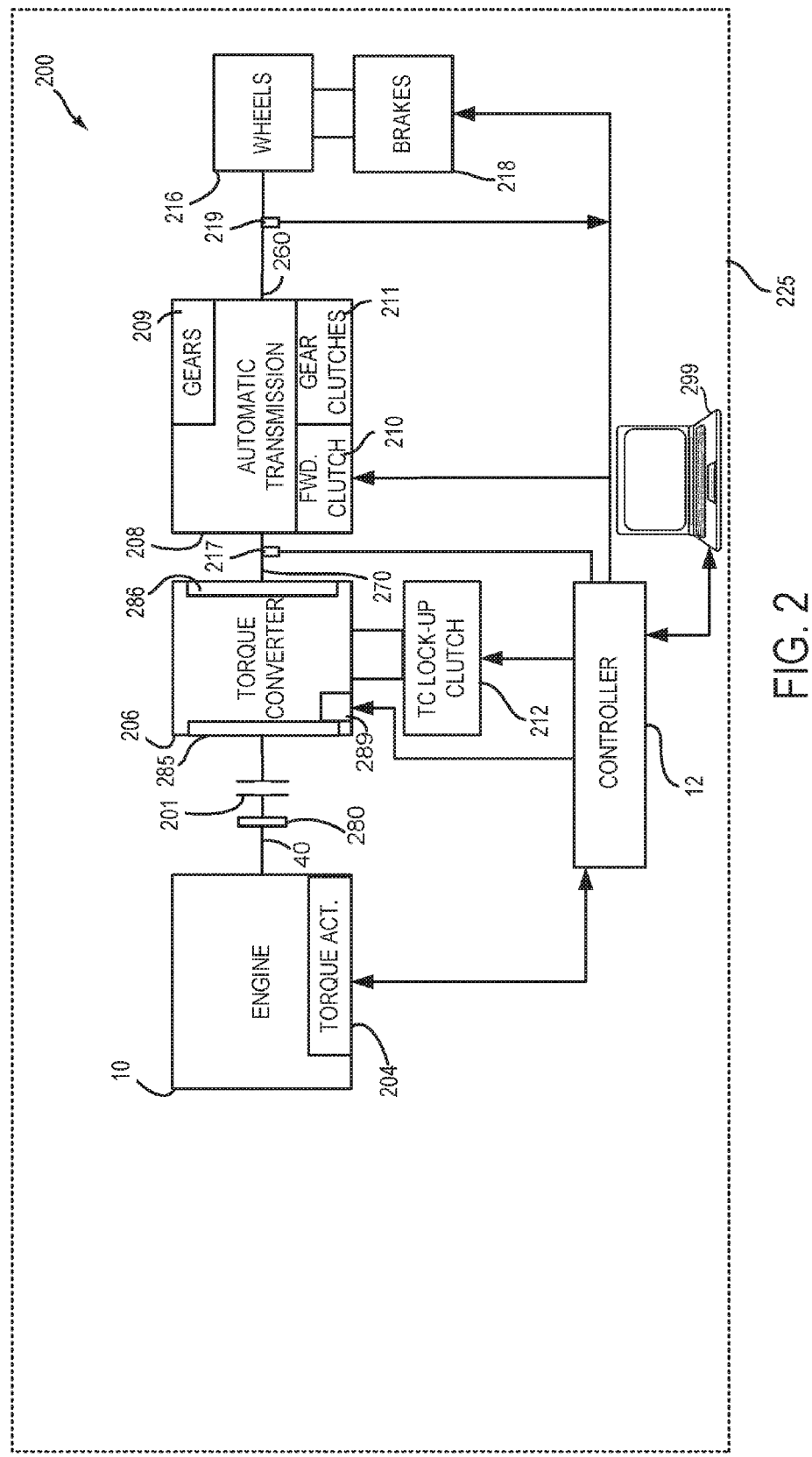
FIG. 2 shows a schematic depiction of an example vehicle powertrain including an engine.
Figure 3:
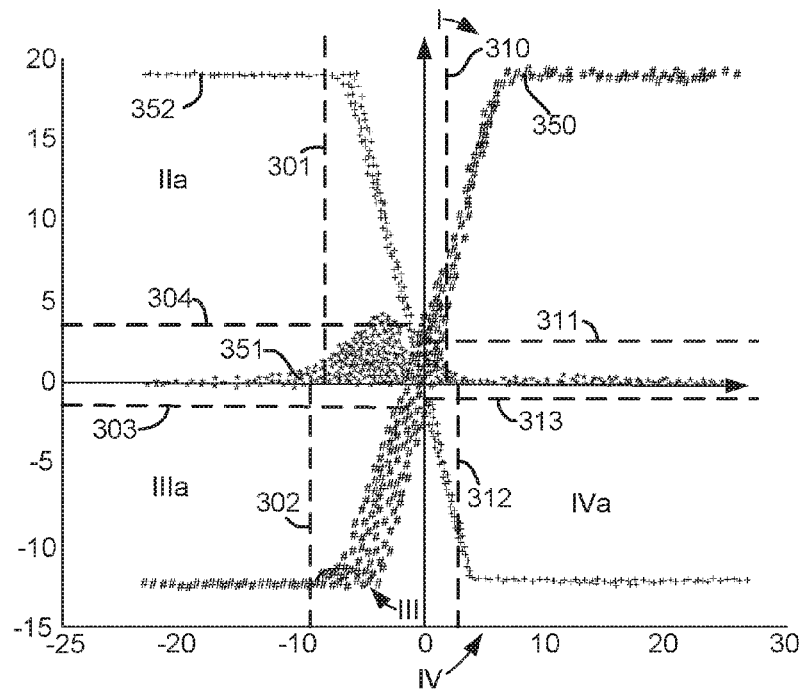
FIGS. 3 and 4 show example plots of differential pressure sensor output.
Figure 4:
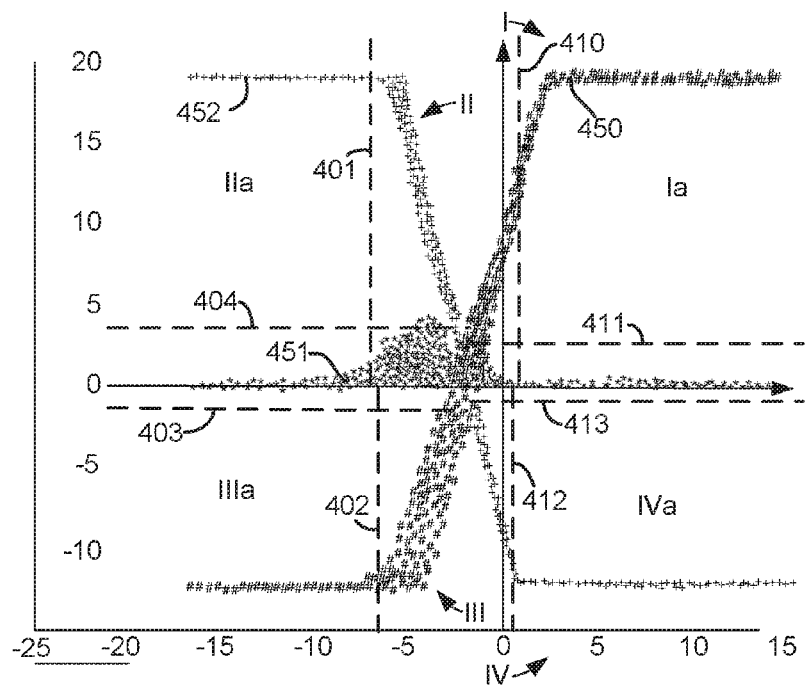

The present description is related to operating an engine that includes an external exhaust gas recirculation (EGR) system. The engine may be configured as is shown in FIG. 1. The engine of FIG. 1 may be incorporated into a vehicle powertrain as shown in FIG. 2, and the engine may be the sole or only adjustable torque source in the powertrain. FIGS. 3 and 4 show differential pressure sensor output profiles during conditions of EGR system degradation. The engine may be operated according to the method shown in FIG. 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers liquid fuel in proportion to a pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 (e.g., central or engine intake manifold throttle) adjusts a position of throttle plate 64 to control air flow from compressor 162 to intake manifold 44. Pressure in boost chamber 45 may be referred to as throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162.

Air filter 43 cleans air entering engine air intake 42 via inlet 3 which is exposed to ambient temperature and pressure. Converted combustion byproducts are exhausted at outlet 5, which is exposed to ambient temperature and pressure. Thus, piston 36 and combustion chamber 30 may operate as a pump when engine 10 rotates to draw air from inlet 3 and exhaust combustion byproducts to outlet 5. Inlet 3 is upstream of outlet 5 according to a direction of flow through engine 10, exhaust manifold 48, and engine air intake 42. Upstream does not include anything outside the engine past the inlet 3, and downstream does not include anything outside the engine past the outlet 5.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

External EGR may be supplied to the engine via conduits 170 and 176. Exhaust gases may flow in the direction of arrow 175 when EGR valve 174 is opened. EGR valve 174 may be closed when pressure in intake manifold 44 is above atmospheric pressure. EGR cooler 171 cools EGR gases and pressure sensor 172 and temperature sensor 173 provide exhaust gas data to controller 12. EGR valve 173 may be opened in variable amounts from full open to fully closed. EGR flows through orifice 180 so that the EGR flow rate may be determined from differential pressure sensor 178. Tube 177 provides upstream EGR pressure to differential pressure sensor 178. Tube 179 provides downstream EGR pressure to differential pressures sensor 178.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by driver 132; a position sensor 154 coupled to brake pedal 150 for sensing force applied by driver 132, a measurement of engine manifold pressure (MAP) from pressure sensor 123 coupled to intake manifold 44; a measurement of engine boost pressure or throttle inlet pressure from pressure sensor 122; an engine position from a Hall effect sensor 118 sensing crankshaft 40 position; a measure of absolute exhaust manifold pressure from pressure sensor 190; a measurement of air mass entering the engine from sensor 120; and a measurement of throttle position from sensor 68. Barometric pressure may also be sensed via sensor 191 for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, FIG. 2 is a block diagram of a vehicle 225 including a powertrain or driveline 200. The powertrain of FIG. 2 includes engine 10 shown in FIG. 1. Engine 10 includes one or more torque actuators 204 (e.g., a throttle, camshaft, fuel injector, etc.) Powertrain 200 may be powered by engine 10. Engine crankshaft 40 is shown coupled to optional dual mass flywheel 280, and dual mass flywheel 280 is shown mechanically coupled to optional driveline disconnect clutch 201 which is mechanically coupled to impeller 285 of torque converter 206. Torque converter impeller 285 is mechanically coupled to transmission pump 289. Mechanically driven transmission pump 289 supplies pressurized transmission fluid to forward transmission clutch 210 and gear clutches (e.g., gear clutches 1-10). Torque converter 206 also includes a turbine 286 which is coupled to transmission input shaft 270. Transmission input shaft 270 mechanically couples torque converter 206 to automatic transmission 208 and its speed is monitored via speed sensor 217. Torque converter 206 also includes a torque converter bypass lock-up clutch 212 (TCC). Torque is directly transferred from impeller 285 to turbine 286 when TCC is locked closed. TCC is electrically operated by controller 12. Alternatively, TCC may be hydraulically locked closed. In one example, the torque converter may be referred to as a component of the transmission. Further, TCC may be partially closed, which provides an adjustable torque capacity for the TCC. The TCC provides a friction torque path through torque converter 206 while torque may also be transferred via fluid between impeller 206 and turbine 286.

Torque transferred via fluid follows a fluidic torque path from impeller 285 to turbine 286.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch application pressure in response to various engine operating conditions, or based on a driver-based engine operation request.

Automatic transmission 208 includes gear clutches 211 and forward clutch 210 to engage or disengage gears 209 (e.g., reverse and gears 1-10). The gear clutches 211 (e.g., 1-10) and the forward clutch 210 may be selectively engaged to propel a vehicle. Transmission 208 is configured such that one gear of gears 209 may be engaged by applying two or more of clutches 211. In other words, a gear may be positively engaged when two or more of clutches 211 are closed. Further, transmission 208 may enter a neutral state where input shaft 270 is not engaged with or coupled to output shaft 260 when one or more of clutches 211 is open but while one or more of clutches 211 are closed. Torque output from the automatic transmission 208 may be relayed to wheels 216 to propel the vehicle via output shaft 260. Speed of output shaft 260 is monitored via speed sensor 219. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal as shown in FIG. 1. In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Torque flows from engine 10 to transmission 208 before being applied to wheels 216. Thus, engine 10 is upstream of torque converter 206, transmission 208, and wheels 216 in a direction of torque flow.

Controller 12 may be configured to receive inputs from engine 10, as shown in more detail in FIG. 1, and accordingly control a torque output of the engine and/or operation of the torque converter, transmission, clutches, and/or brakes. Further, controller 12 may receive driver input from man/machine interface 299. In some examples, human/machine interface 299 may provide powertrain information and indications to a driver. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Thus, the system of FIGS. 1 and 2 provide for a vehicle system, comprising: an engine including an intake manifold and an exhaust manifold; an exhaust gas recirculation system including a conduit coupling the intake manifold to the exhaust manifold, a differential pressure sensor located along the conduit, and an intake manifold pressure sensor; a barometric pressure sensor; and a controller including executable instructions stored in non-transitory memory to adjust a state of an actuator in response to an indication of exhaust gas recirculation system degradation based on an absolute value of an output of the differential pressure sensor being greater than a sixth threshold and an absolute value of an output of the engine intake manifold pressure sensor minus an output of the barometric pressure sensor being greater than a fifth threshold.

In some examples, the vehicle system includes where the actuator is a fuel injector. The vehicle system also includes where the actuator is a throttle. The vehicle system also includes where the actuator is an ignition system. The vehicle system further comprises additional instructions to adjust the actuator in response to an indication of exhaust gas recirculation system degradation based on an output of the differential pressure sensor being greater than a fourth threshold and an absolute value of an output of the engine intake manifold pressure sensor minus an output of the barometric pressure sensor being greater than a third threshold. The vehicle system includes where the executable instructions are executed when the engine is not idling.

Referring now to FIG. 3, a plot of an EGR system differential pressure versus engine intake manifold pressure minus barometric pressure is shown. The vertical axis represents EGR system differential pressure. The horizontal axis represents engine intake manifold pressure minus barometric pressure. The engine is operated with intake manifold pressure greater than barometric pressure when intake manifold pressure minus barometric pressure is greater than zero. The engine is operated with intake manifold pressure less than barometric pressure when intake manifold pressure minus barometric pressure is less than zero.

Quadrant I is the upper right quadrant of the plot and it extends to the right of zero engine intake manifold pressure and above zero differential pressure. Quadrant I contains sub-quadrant Ia and it is bounded on its left side by vertical line 310 and on its bottom side by horizontal line 311. Sub-quadrant Ia represents a region where EGR system degradation is present. EGR system degradation is present when engine intake manifold pressure minus barometric pressure is greater than a first predetermined threshold and when differential pressure is greater than a second predetermined threshold (e.g., the area within sub-quadrant Ia).

Quadrant II is the upper left quadrant of the plot and it extends to the left of zero engine intake manifold pressure and above zero differential pressure. Quadrant II contains sub-quadrant IIa and it is bounded on its right side by vertical line 301 and on its bottom side by horizontal line 304. Sub-quadrant IIa represents a region where EGR system degradation is present. EGR system degradation is present when the absolute value of engine intake manifold pressure minus barometric pressure is greater than a third predetermined threshold and when differential pressure is greater than a fourth predetermined threshold (e.g., the area within sub-quadrant IIa).

Quadrant III is the lower left quadrant of the plot and it extends to the left of zero engine intake manifold pressure and below zero differential pressure. Quadrant III contains sub-quadrant IIIa and it is bounded on its right side by vertical line 302 and its top side by horizontal line 303. Sub-quadrant IIIa represents a region where EGR system degradation is present. EGR system degradation is present when the absolute value of engine intake manifold pressure minus barometric pressure is greater than a fifth predetermined threshold and when the absolute value of the differential pressure is greater than a sixth predetermined threshold (e.g., the area within sub-quadrant IIIa).

Quadrant IV is the lower right quadrant of the plot and it extends to the right of zero engine intake manifold pressure and below zero differential pressure. Quadrant IV contains sub-quadrant IVa and it is bounded on its left side by vertical line 312 and on its top side by horizontal line 313. Sub-quadrant IVa represents a region where EGR system degradation is present. EGR system degradation is present when engine intake manifold pressure minus barometric pressure is greater than a seventh predetermined threshold and when an absolute value of the differential pressure is greater than an eight predetermined threshold (e.g., the area within sub-quadrant IVa).

Curve 350, shown as points indicated by #, represents differential pressure as measured by a differential pressure sensor (e.g., 178 of FIG. 1) when a hose is off or a leak is present downstream of the differential pressure sensor. For example, if hose 179 of FIG. 1 is off, differential pressure sensor output is similar to curve 350.

Curve 352, shown as points indicated by +, represents differential pressure as measured by a differential pressure sensor (e.g., 178 of FIG. 1) when a hose is off or a leak is present upstream of the differential pressure sensor. For example, if hose 177 of FIG. 1 is off, differential pressure sensor output is similar to curve 352.

Curve 351, shown as points indicated by *, represents differential pressure as measured by a differential pressure sensor (e.g., 178 of FIG. 1) when no hose is off and no leaks are present in the EGR system.

It may be observed that curve 351 does not enter into sub-quadrants Ia, IIa, IIIa, and IVa. However, if a hose is off or a leak is present in the EGR system, measurements from the differential pressure and measurements from the engine intake manifold pressure sensor minus measurements from the barometric pressure sensor enter regions Ia, IIa, IIIa, and IVa during select operating conditions as indicated above. Thus, if output from the differential pressure sensor, barometric pressure sensor, and engine intake manifold pressure sensor indicate conditions of operating in sub-quadrants Ia, IIa, IIIa, or IVa, EGR system degradation may be judged to be present since curve 351 does not enter these operating regions. In this way, EGR system degradation may be evaluated at conditions other than engine idle conditions.

Referring now to FIG. 4, a plot of an EGR system differential pressure versus engine intake manifold pressure minus exhaust absolute pressure is shown. The vertical axis represents EGR system differential pressure. The horizontal axis represents engine intake manifold pressure minus exhaust absolute pressure. The engine is operated with intake manifold pressure greater than barometric pressure when intake manifold pressure minus exhaust absolute pressure is greater than zero. The engine is operated with intake manifold pressure less than barometric pressure when intake manifold pressure minus exhaust absolute pressure is less than zero.

Quadrant I is the upper right quadrant of the plot and it extends to the right of zero engine intake manifold pressure and above zero differential pressure. Quadrant I contains sub-quadrant Ia and it is bounded on its left side by vertical line 410 and on its bottom side by horizontal line 411. Sub-quadrant Ia represents a region where EGR system degradation is present. EGR system degradation is present when engine intake manifold pressure minus exhaust absolute pressure is greater than a first predetermined threshold and when differential pressure is greater than a second predetermined threshold (e.g., the area within sub-quadrant Ia).

Quadrant II is the upper left quadrant of the plot and it extends to the left of zero engine intake manifold pressure and above zero differential pressure. Quadrant II contains sub-quadrant IIa and it is bounded on its right side by vertical line 401 and on its bottom side by horizontal line 404. Sub-quadrant IIa represents a region where EGR system degradation is present. EGR system degradation is present when the absolute value of engine intake manifold pressure minus exhaust absolute pressure is greater than a third predetermined threshold and when differential pressure is greater than a fourth predetermined threshold (e.g., the area within sub-quadrant IIa).

Quadrant III is the lower left quadrant of the plot and it extends to the left of zero engine intake manifold pressure and below zero differential pressure. Quadrant III contains sub-quadrant IIIa and it is bounded on its right side by vertical line 402 and its top side by horizontal line 403. Sub-quadrant IIIa represents a region where EGR system degradation is present. EGR system degradation is present when the absolute value of engine intake manifold pressure minus exhaust absolute pressure is greater than a fifth predetermined threshold and when the absolute value of the differential pressure is greater than a sixth predetermined threshold (e.g., the area within sub-quadrant IIIa).

Quadrant IV is the lower right quadrant of the plot and it extends to the right of zero engine intake manifold pressure and below zero differential pressure. Quadrant IV contains sub-quadrant IVa and it is bounded on its left side by vertical line 412 and on its top side by horizontal line 413. Sub-quadrant IVa represents a region where EGR system degradation is present. EGR system degradation is present when engine intake manifold pressure minus exhaust absolute pressure is greater than a seventh predetermined threshold and when an absolute value of the differential pressure is greater than an eight predetermined threshold (e.g., the area within sub-quadrant IVa).

Curve 450 represents differential pressure as measured by a differential pressure sensor (e.g., 178 of FIG. 1) when a hose is off or a leak is present downstream of the differential pressure sensor. For example, if hose 179 of FIG. 1 is off, differential pressure sensor output is similar to curve 450.

Curve 452 represents differential pressure as measured by a differential pressure sensor (e.g., 178 of FIG. 1) when a hose is off or a leak is present upstream of the differential pressure sensor. For example, if hose 177 of FIG. 1 is off, differential pressure sensor output is similar to curve 452.

Curve 451 represents differential pressure as measured by a differential pressure sensor (e.g., 178 of FIG. 1) when no hose is off and no leaks are present in the EGR system.

It may be observed that curve 451 does not enter into sub-quadrants Ia, IIa, IIIa, and IVa. However, if a hose is off or a leak is present in the EGR system, measurements from the differential pressure sensor and measurements from the engine intake manifold pressure sensor minus measurements from the exhaust pressure sensor enter regions Ia, IIa, IIIa, and IVa during select operating conditions as indicated above. Thus, if output from the differential pressure sensor, exhaust pressure sensor, and engine intake manifold pressure sensor indicate conditions of operating in sub-quadrants Ia, IIa, IIIa, or IVa, EGR system degradation may be judged to be present since curve 451 does not enter these operating regions. In this way, EGR system degradation may be evaluated at conditions other than engine idle conditions.

Figure 5:
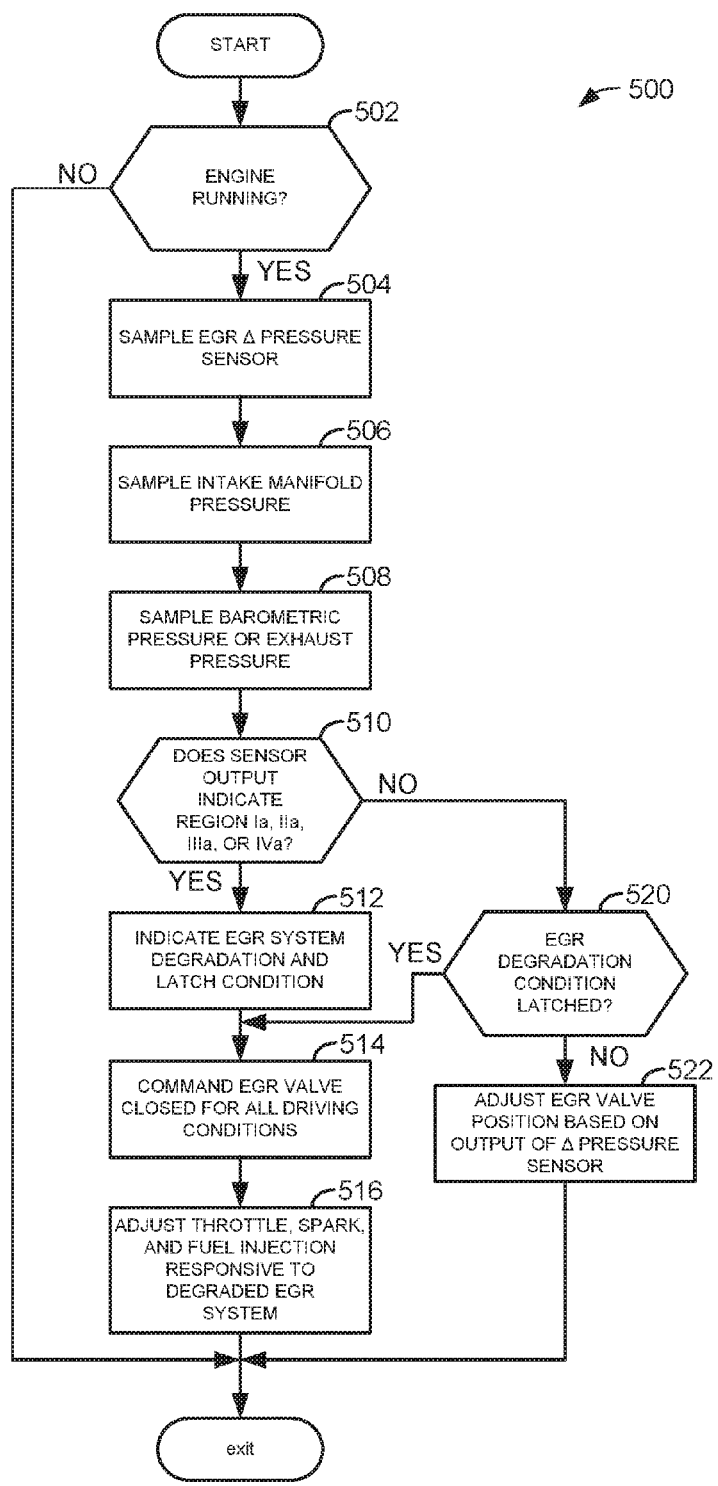
FIG. 5 shows an example method for operating an engine.

Referring now to FIG. 5, a method for operating an engine is shown. The method of FIG. 5 may be applied to the powertrain shown in FIGS. 1 and 2. Further, at least portions of the method of FIG. 5 may be included as executable instructions in the system of FIGS. 1 and 2. And, at least portions of the method of FIG. 5 may be actions taken within the physical world to transform states of engine actuators and other engine and transmission components.

At 502, method 500 judges if the engine is running (e.g., combusting air and fuel). The engine may be judged running if engine speed is greater than a threshold and spark and fuel are being supplied to the engine. If method 500 judges that the engine is running, the answer is yes and method 500 proceeds to 504. Otherwise the answer is no and method 500 proceeds to exit.

At 504, method 500 samples output of a differential or delta pressure sensor to determine a pressure difference across an orifice in the EGR system. In one example, differential pressure voltage output is converted into differential pressure via a transfer function using differential pressure sensor voltage as input to the transfer function. Method 500 proceeds to 506 after the differential pressure sensor output is sampled and differential pressure at the differential pressure sensor is determined.

At 506, method 500 samples output of an engine intake manifold absolute pressure (MAP) sensor. In one example, MAP sensor voltage output is converted into pressure via a transfer function using MAP sensor voltage as input to the transfer function. Method 500 proceeds to 508 after the MAP sensor output is sampled and intake manifold absolute pressure is determined.

At 508, method 500 samples output of a barometric pressure sensor or an exhaust manifold pressure sensor to determine a barometric pressure or exhaust absolute pressure. In one example, barometric sensor or exhaust pressure sensor pressure voltage output is converted into barometric pressure or exhaust pressure via a transfer function using exhaust pressure sensor voltage or barometric pressure sensor voltage as input to the transfer function. Method 500 proceeds to 510 after the barometric pressure sensor output or exhaust pressure sensor output is sampled and exhaust pressure or barometric pressure is determined.

At 510, method 500 judges sensor output from the differential pressure sensor, barometric pressure sensor, engine exhaust manifold pressure sensor, and engine intake manifold pressure sensors indicate that the differential pressure sensor is exposed to conditions shown in sub-quadrants Ia, IIa, IIIa, or IVa of the EGR maps shown in FIGS. 3 and 4. For example, EGR system degradation may be judged present when engine intake manifold pressure minus barometric pressure is greater than a first predetermined threshold and when differential pressure is greater than a second predetermined threshold as shown in FIG. 3. Further, EGR system degradation may be judged present when the absolute value of engine intake manifold pressure minus barometric pressure is greater than a third predetermined threshold and when differential pressure is greater than a fourth predetermined threshold. Also, EGR system degradation may be judged present when the absolute value of engine intake manifold pressure minus barometric pressure is greater than a fifth predetermined threshold and when the absolute value of the differential pressure is greater than a sixth predetermined threshold. In addition, EGR system degradation may be judged present when engine intake manifold pressure minus barometric pressure is greater than a seventh predetermined threshold and when an absolute value of the differential pressure is greater than an eight predetermined threshold.

Thus, if differential pressure sensor output and intake manifold pressure sensor output indicates the system is operating in sub-quadrants Ia, IIa, IIIa, or IVa EGR system degradation may be determined. If method 500 judges that EGR system degradation is present, the answer is yes and method 500 proceeds to 512. Otherwise, the answer is no and method 500 proceeds to 520.

At 512, method 500 indicates EGR system degradation and latches the condition into memory. Method 500 may indicate EGR degradation via a human/machine interface, dash-board light, or other known type of display. Further, the indication of EGR system degradation may be stored as a value in a bit or word of memory. For example, a bit in memory may be change from a value of zero to one to indicate EGR system degradation. The value may stay stored in memory or latched in memory until a service person clears the bit back to a value of zero via a human\machine interface. Method 500 proceeds to 514.

At 514, method 500 commands the EGR valve closed for all driving conditions. By closing the EGR valve, exhaust gas flow toward the EGR orifice may be stopped so that EGR does not flow out of the engine without being treated via an emissions reduction device. Further, closing the EGR valve may inhibit air flow into the exhaust system, which may improve engine emissions during EGR system degradation. Method 500 proceeds to 516.

At 516, method 500 may adjust the engine throttle, spark timing, and fuel injection amounts. If unmetered air enters the engine from the EGR system during low driver demand torque, the exhaust gas oxygen sensor may indicate lean combustion. The throttle may be adjusted in a closing direction to compensate for the additional air provided by the degraded EGR system. Spark energy may also be increased by increasing an ignition coil dwell time during periods where lean combustion may be observed. Further, injection fuel pulse width may be increased to provide a stoichiometric air-fuel ratio to the engine if air flows into the intake manifold via the EGR system. If the amount of fuel is increased to provide a stoichiometric air-fuel mixture, the spark timing may be retarded so that the desired driver demand torque is provided by the engine.

If the engine is operating at a higher demand torque, the exhaust gas oxygen sensor may indicate rich combustion due to pressurized air leaking out of the EGR system from the pressurized engine intake manifold. The boost amount may be adjusted via adjusting a waste gate position to provide a desired boost pressure. Method 500 proceeds to exit after indicating and mitigating EGR degradation.

At 520, method 500 judges if an EGR degradation indication is latched into memory. In one example, method 500 reads a value of a bit or word in memory. If the bit or word indicates EGR degradation is present, the answer is yes and method 500 proceeds to 514. Otherwise, the answer is no and method 500 proceeds to 522.

At 522, method 500 adjusts a position of the EGR valve based on a desired EGR flow rate and output of the differential or delta pressure sensor. In one example, a flow rate estimated from output of the differential pressure sensor is subtracted from a desired EGR flow rate and the EGR valve position is adjusted responsive to the result. The desired EGR flow rate may be empirically determined and stored in a table or function that is indexed via engine torque and engine speed. Method 500 proceeds to exit after adjusting EGR valve position.

Thus, the method of FIG. 5 provides for a method for operating an engine, comprising: receiving a differential pressure sensor output and intake manifold pressure sensor output to a controller; judging whether or not exhaust gas recirculation system degradation is present responsive to the differential pressure sensor output and the intake manifold pressure sensor output while operating an engine with intake manifold pressure greater than atmospheric pressure via the controller; and adjusting an actuator via the controller responsive to the judgment. The method includes where the actuator is a waste gate.

In some examples, the method further comprises converting the differential pressure sensor output to a differential pressure, and where the judgement is based on the differential pressure exceeding a second threshold. The method further comprises converting the intake manifold pressure sensor output to an intake manifold pressure, and where the judgement is also based on the intake manifold pressure minus a barometric pressure exceeding a first threshold. The method further comprises converting the differential pressure sensor output to a differential pressure, and where the judgement is based on an absolute value of the differential pressure exceeding an eighth threshold. The method further comprises converting the intake manifold pressure sensor output to an intake manifold pressure, and where the judgement is also based on the intake manifold pressure minus a barometric pressure exceeding a seventh threshold. The method further comprises closing an exhaust gas recirculation valve while operating the engine with intake manifold pressure greater than atmospheric pressure.

The method of FIG. 5 also provides for a method for operating an engine, comprising: receiving a differential pressure measurement and a second measurement to a controller; judging presence of EGR system degradation upstream of a differential pressure sensor in response to an absolute value of the differential pressure measurement being greater than an eighth threshold and engine intake manifold pressure minus the second measurement being greater than a seventh threshold; and adjusting an actuator via the controller responsive to the judgment. The method further comprises judging presence of EGR system degradation downstream of a differential pressure sensor in response to the differential pressure measurement being greater than a second threshold and engine intake manifold pressure minus the second measurement being greater than a first threshold. The method includes where the second measurement is a measurement of barometric pressure. The method includes where the second measurement is a measurement of exhaust manifold pressure.

In some examples, the method further comprises judging presence of EGR system degradation downstream of a differential pressure sensor in response to an absolute value of the differential pressure measurement being greater than a sixth threshold and an absolute value of engine intake manifold pressure minus the second measurement being greater than a fifth threshold. The method further comprises judging presence of EGR system degradation upstream of a differential pressure sensor in response to the differential pressure measurement being greater than a fourth threshold and an absolute value of engine intake manifold pressure minus the second measurement being greater than an third threshold. The method includes where the engine is operating with a positive intake manifold pressure while the controller receives the differential pressure measurement and the second measurement.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware to manipulate operating states of the various devices disclosed. As will be appreciated by one of ordinary skill in the art, the methods described may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating an engine, comprising:
receiving a differential pressure sensor output and an intake manifold pressure sensor output to a controller;
judging whether or not exhaust gas recirculation system degradation is present via the controller responsive to the differential pressure sensor output and the intake manifold pressure sensor output while operating an engine with intake manifold pressure greater than atmospheric pressure via the controller, where the judgement is based on the differential pressure sensor output exceeding a second threshold, and further comprising:
converting the differential pressure sensor output to a differential pressure; and
adjusting an actuator coupled to the engine and the controller via the controller responsive to the judgement.

2. The method of claim 1, where the actuator is a waste gate of a turbocharger coupled to the engine.

3. The method of claim 1, further comprising converting the intake manifold pressure sensor output to an intake manifold pressure, and where the judgement is also based on the intake manifold pressure minus a barometric pressure exceeding a first threshold.

4. The method of claim 1, where the judgement is based on an absolute value of the differential pressure exceeding an eighth threshold.

5. The method of claim 4, further comprising converting the intake manifold pressure sensor output to an intake manifold pressure, and where the judgement is also based on the intake manifold pressure minus a barometric pressure exceeding a seventh threshold.

6. The method of claim 1, further comprising closing an exhaust gas recirculation valve while operating the engine with the intake manifold pressure greater than atmospheric pressure.

7. A method for operating an engine, comprising:
receiving a differential pressure measurement and a second measurement to a controller while operating an engine;
judging a presence of EGR system degradation upstream of a differential pressure sensor via the controller in response to an absolute value of the differential pressure measurement being greater than an eighth threshold and an engine intake manifold pressure minus the second measurement being greater than a seventh threshold as determined via the controller; and
adjusting an actuator coupled to the engine and the controller via the controller responsive to the judgement.

8. The method of claim 7, further comprising judging a presence of EGR system degradation downstream of the differential pressure sensor in response to the differential pressure measurement being greater than a second threshold and the engine intake manifold pressure minus the second measurement being greater than a first threshold.

9. The method of claim 7, where the second measurement is a measurement of barometric pressure.

10. The method of claim 7, where the second measurement is a measurement of exhaust manifold pressure.

11. The method of claim 7, further comprising judging a presence of EGR system degradation downstream of the differential pressure sensor in response to the absolute value of the differential pressure measurement being greater than a sixth threshold and an absolute value of the engine intake manifold pressure minus the second measurement being greater than a fifth threshold.

12. The method of claim 7, further comprising judging a presence of EGR system degradation upstream of the differential pressure sensor in response to the differential pressure measurement being greater than a fourth threshold and an absolute value of the engine intake manifold pressure minus the second measurement being greater than an third threshold.

13. The method of claim 7, where the engine is operating with a positive intake manifold pressure while the controller receives the differential pressure measurement and the second measurement.

14. A vehicle system, comprising:
an engine including an intake manifold and an exhaust manifold;
an exhaust gas recirculation system including a conduit coupling the intake manifold to the exhaust manifold, a differential pressure sensor located along the conduit, and an intake manifold pressure sensor;
a barometric pressure sensor; and
a controller including executable instructions stored in non-transitory memory to adjust a state of an actuator while operating the engine in response to an indication of exhaust gas recirculation system degradation based on an absolute value of an output of the differential pressure sensor being greater than a sixth threshold as determined via the controller and an absolute value of an output of the engine intake manifold pressure sensor minus an output of the barometric pressure sensor being greater than a fifth threshold as determined via the controller.

15. The vehicle system of claim 14, where the actuator is a fuel injector.

16. The vehicle system of claim 14, where the actuator is a throttle.

17. The vehicle system of claim 14, where the actuator is an ignition system.

18. The vehicle system of claim 14, further comprising additional instructions to adjust the actuator while operating the engine in response to the indication of exhaust gas recirculation system degradation based on the output of the differential pressure sensor being greater than a fourth threshold and the absolute value of the output of the engine intake manifold pressure sensor minus the output of the barometric pressure sensor being greater than a third threshold.

19. The vehicle system of claim 14, where the executable instructions are executed when the engine is not idling.

* * * * *